United States Patent [19]

Castonguay et al.

[11] Patent Number: 4,477,701
[45] Date of Patent: Oct. 16, 1984

[54] SECONDARY DISCONNECT PLUGS FOR PROGRAMMABLE CIRCUIT BREAKERS

[75] Inventors: Roger N. Castonguay, Terryville; Charles L. Jencks, Avon, both of Conn.

[73] Assignee: General Electric Company, New York, N.Y.

[21] Appl. No.: 440,642

[22] Filed: Nov. 10, 1982

[51] Int. Cl.³ .............................................. H01H 9/20
[52] U.S. Cl. .............................................. 200/50 AA
[58] Field of Search .............................. 361/335–339, 361/343, 344; 200/50 AA

[56] References Cited

U.S. PATENT DOCUMENTS 2,858,389  10/1958  Cuorato et al. .............. 200/50 AA
4,020,301   4/1977  Ericson et al. ............... 200/50 AA
4,139,748   2/1979  Wolfe et al. .................. 200/50 AA Primary Examiner—J. R. Scott
Attorney, Agent, or Firm—R. A. Menelly; W. C. Bernkopf; Fred Jacob

[57] ABSTRACT

A secondary disconnect plug is arranged on the sidewall of a circuit breaker compartment for mating with a complimentary receptacle attached to the sidewall of a track-mounted circuit breaker for allowing auxiliary electrical functions to be maintained when the circuit breaker is partially withdrawn from the compartment to a test position. The disconnect plug is floatingly attached to the compartment sidewall and contains a centering and aligning mechanism to provide a wide range of tolerance when the circuit breaker is moved in and out of the compartment.

10 Claims, 6 Drawing Figures

SECONDARY DISCONNECT PLUGS FOR PROGRAMMABLE CIRCUIT BREAKERS

BACKGROUND OF THE INVENTION

U.S. Pat. No. 4,266,259 to Howell discloses a programmable static trip circuit breaker which includes a plurality of auxiliary functions such as a shunt-trip facility and under-voltage release. The circuit breaker contacts employed with static trip breakers are generally mounted in a compartment and the circuit breaker assembly is moved in and out of the compartment by means of rails. When the circuit breaker is fully within the compartment, the main contacts of the breaker fully engage the main receptacles within the compartment. When the circuit breaker is partially removed from the compartment, the main contacts are broken and some means must be provided for allowing electrical continuity for auxiliary function test purposes. The use of programmable static trip circuit breakers has increased the number of auxiliary functions that can be provided to circuit breaker compartments and hence has increased the number of contacts within the secondary disconnect assembly to provide electrical connection for the added functions.

U.S. Pat. No. 4,020,301 to Ericson et al. discloses secondary disconnects mounted on the side of the circuit breaker and compartment respectively. These contacts slidingly engage when the circuit breaker is moved within the compartment and slidingly disengage when the breaker is at least partially removed. The large contacts required with the Ericson et al. patent assembly do not readily provide sufficent space for the provision of extra contacts when programmable static trip circuit breakers are employed.

U.S. Pat. No. 4,139,748 to Wolfe et al. discloses the provision of secondary contacts on the rear surface of the breaker. The provision of rear mounted secondary disconnects does not readily lend itself to ready accessibility for inspection, replacement and repair.

One of the problems involved with increasing the number of contacts within a side-mounted secondary disconnect assembly is the difficulty in dynamic alignment between the contact pins on the disconnect plug and the corresponding holes within the receptacle. When an AMP-type connector plug is used for a disconnect assembly, a large number of contact pins and receptacle holes are arranged in a closely spaced array. AMP is a trademark of the AMP Electric Company for electrical connectors. This arrangement does not lend itself to a movable mechanized disconnect assembly because some means must be employed for ensuring that the pins become centered and aligned with the corresponding receptacle holes or the pins could become damaged during the connection process.

The purpose of this invention, therefore, is to provide a disconnect assembly employing a plurality of contacts within a disconnect assembly having centering and alignment facility so that the contact pins become readily aligned and centered with respect to the receptacle holes during a dynamic connection process.

SUMMARY OF THE INVENTION

Circuit breaker compartment secondary disconnects having a large number of electrical contacts are arranged on a side portion of the breaker and a side portion of the compartment. The receptacle portion is attached to the sidewall of the breaker and the plug portion is attached to the adjacent sidewall of the compartment by means of a centering and alignment mechanism. The alignment mechanism includes a linear takeup spring to control the forces applied between the contact pins and the receptacle while a centering mechanism consisting of a pair of lead-in pins enclosed within compression springs provide for accurate centering between the pins and the holes.

DESCRIPTION OF THE PREFERRED EMBODIMENT

Figure 1:
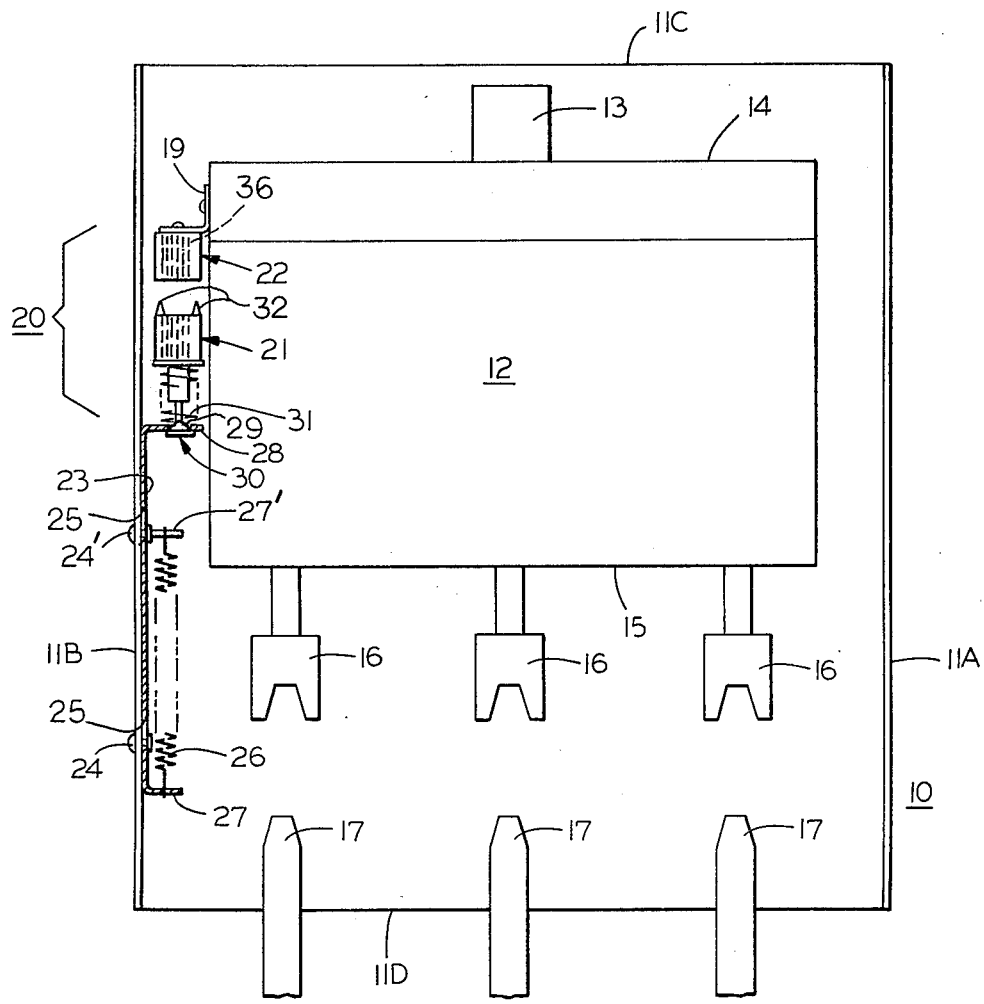
FIG. 1 is a plan view of a circuit breaker compartment containing the secondary disconnect plugs of the invention in an open configuration and the main circuit breaker contacts in an open configuration.

FIG. 1 shows a circuit breaker compartment 10 of the type consisting of a pair of sidewalls 11A, 11B and opposing front and rear walls 11D, 11C. A circuit breaker 12 of the type described within the aformentioned patent to Ericson et al., which patent is incorporated herein for purposes of reference and to which reference can be made for a more complete description of the circuit breaker and compartment assembly. The circuit breaker is the type having an operating handle 13 on the front cover 14 for engagement by an operator. On the circuit breaker rear surface 15 are disposed three receivers 16 for engaging with complimentary stabs 17 on the compartment rear wall 11D. Each stab corresponds to a different phase and a similar row of receivers and stabs is situated below those shown in FIG. 1. The top row of receivers and stabs connect with the line bus and the bottom row of receivers and stabs connect with the load bus.

Secondary disconnects 20 consisting of a contact plug 22 attached to the side of breaker 12 by means of a mounting bracket 19 and a receptacle 21 mounted to the side wall of the compartment by means of a bracket 23. Plug 22 contains a plurality of electrical contact pins 36 each of which connects with a separate electrical circuit within the breaker for electrically connecting with a plurality of holes within the receptacle to maintain electrical continuity when the breaker is partially removed from the compartment and the receivers are disconnected from the stabs. In order to center and align the pins within plug 22 a pair of guide pins 32 are provided on the forward surface of the receptacle 21 and a centering pin 30 is provided through an opening 29 in the bracket upright 28. A takeup spring 26 is connected between post 27 on bracket 23 and extension 27 of bolt 24. Bracket 23 slidingly moves by means of bolts 24, 24 within slots 25 which are provided through bracket 23.

Figure 2:
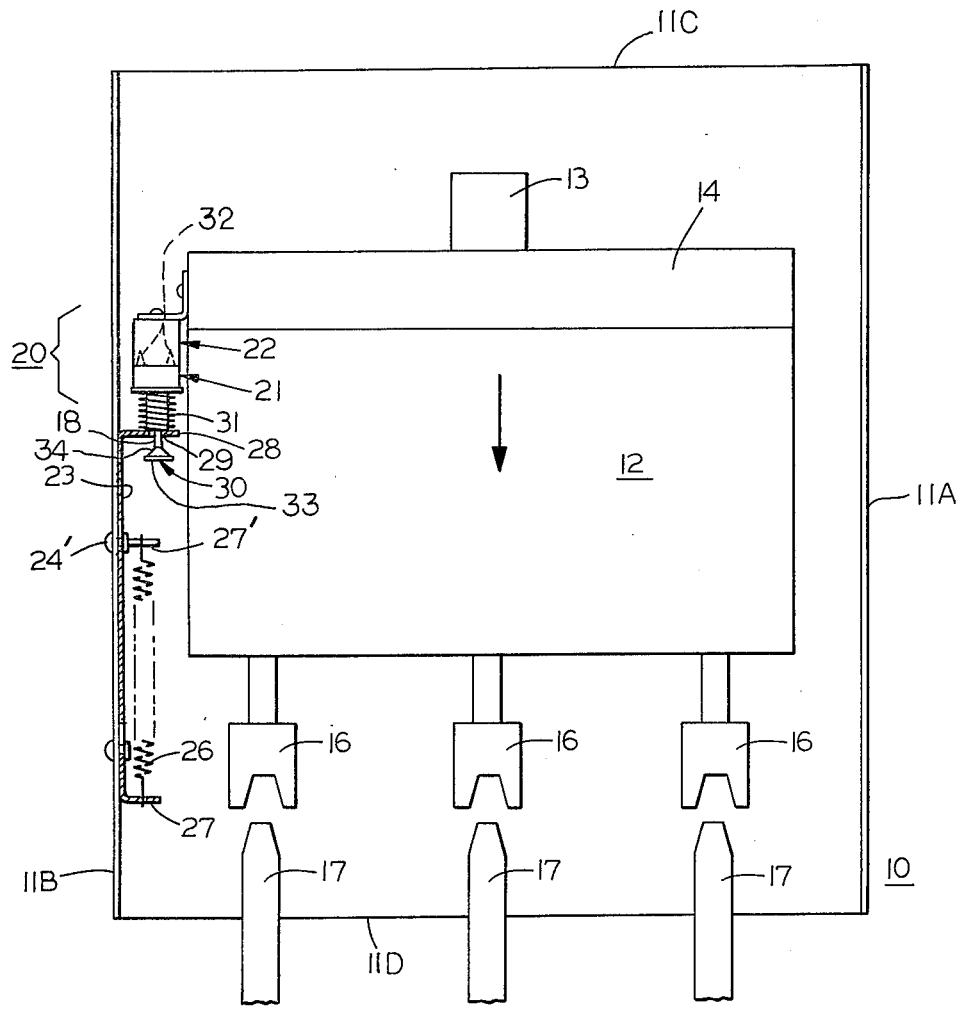
FIG. 2 is a plan view of the circuit breaker compartment depicted in FIG. 1 with the secondary disconnects in a closed or test position configuration and the main circuit breaker contacts in an open configuration.

FIG. 2 shows the secondary disconnects 20 with breaker 12 arranged in an intermediate or test position so that the receivers 16 are disconnected from the compartment connector stabs 17. A plug 22 is engaged with receptacle 21 so that electrical continuity exists through the secondary disconnects such that the breaker auxiliary functions remain operable for test purposes. The centering pin 30 is shown with pin cap 33 and centering pin shaft 18 fully extended from bracket upright 28. Centering pin spring 31, which is a compression spring, is fully compressed whereas takeup spring 26 is slightly more extended than when the breaker is in the completely open configuration shown in FIG. 1. centering pin bevel 34, situated forward of the pin cap 33, is out of the bracket opening 29 when contact plug 22 and receptacle 21 are fully engaged.

Figure 3:
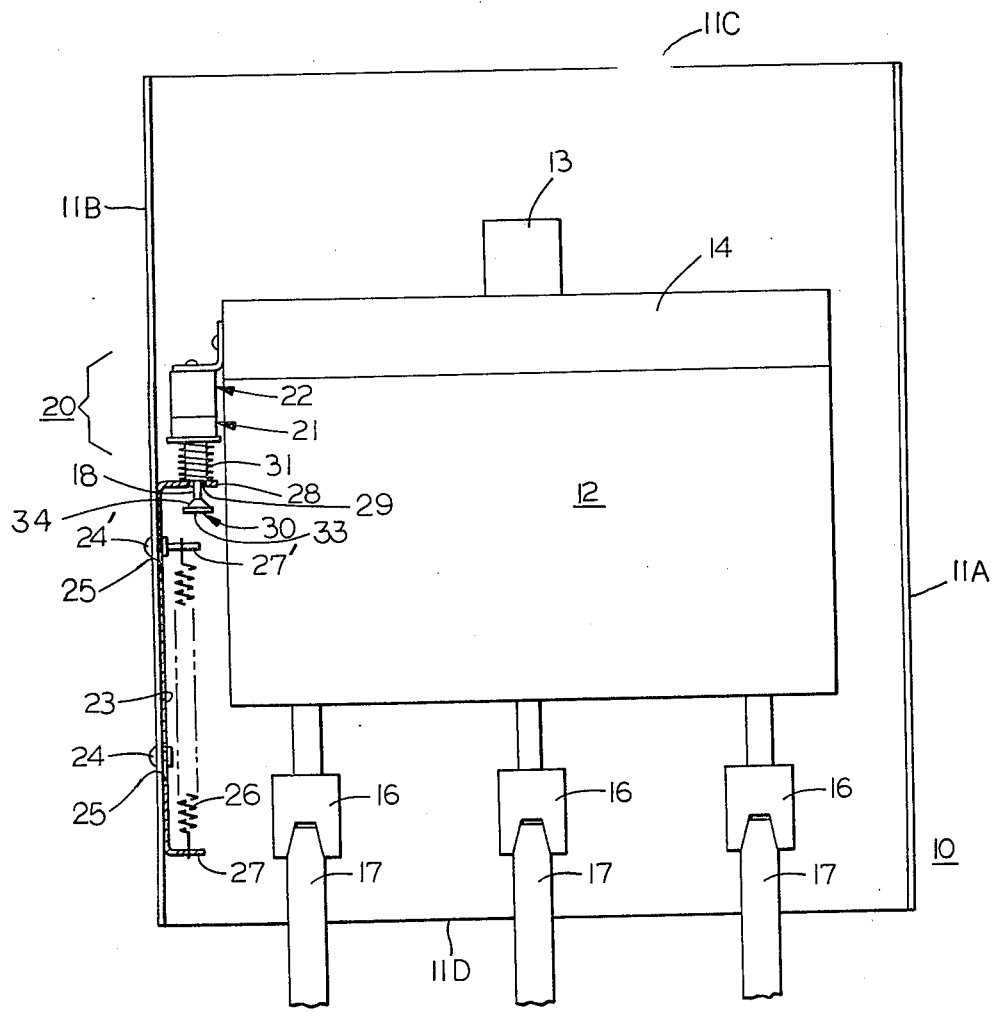
FIG. 3 is a plan view of the circuit breaker compartment depicted in FIGS. 1 and 2 with the secondary disconnects and the main circuit breaker contacts both in a closed configuration.

In FIG. 3, circuit breaker 12 is completely within compartment 10 and the receivers 16 are fully engaged with the compartment stabs 17. Secondary disconnects 20 are also in a closed position with contact plug 22 engaged with receptacle 21. Pin cap 33 of centering pin 30 is fully extended such that pin cap 33 and shaft 18 are at the maximum displacement from bracket upright 28 and bevel 34 is maximum distance from bracket opening 29. Centering pin spring 31 remains compressed and takeup spring 26 becomes more extended than in the test position shown in FIG. 2.

Figure 4:
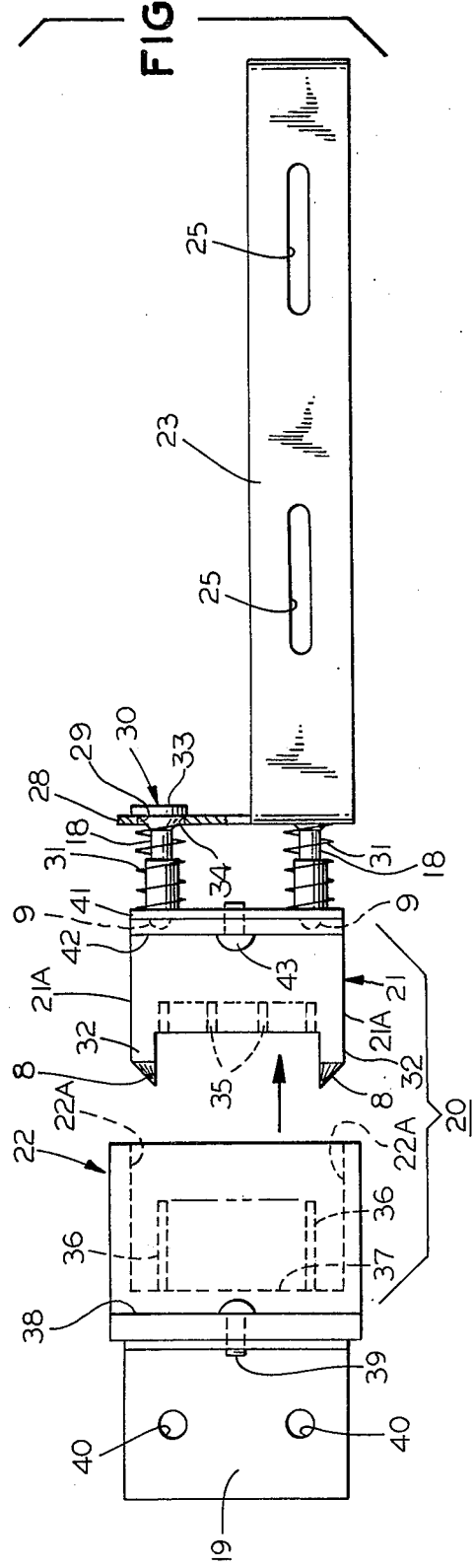
FIG. 4 is an enlarged side view of the secondary disconnects of the invention with the contact plug and receptacle in isometric projection.

The centering and alignment properties for disconnects 20 can be seen by referring now to FIG. 4. Contact plug 22 is shown in an exploded view. The receptacle mounting bracket 23 which contains two extended slots 25 and bracket upright 28, supports receptacle 21 against the tension of the takeup spring 26 (FIG. 3) while the pair of centering pins 30 flexibly support receptacle 21 on bracket upright 28. The tension provided by a corresponding pair of centering pin springs 31 forces the pin caps tightly against the bracket upright 28. The centering pin shafts 18 are fixedly attached to the receptacle mounting plate 41 by means of screws or rivets 9 while the receptacle 21 is fixedly attached to plate 41 by means of a mounting screw 43 extending through the receptacle bottom plate 42. The provision of centering pin springs 31 and the nesting of centering pin bevels 34 within bracket opening 29 give receptacle 21 freedom to move in all directions while centering pin springs 31 maintain the pin caps 33 against bracket upright 28. The provision of a pair of guide pins 32 on the receptacle sidewalls 21A allows the sidewalls of the receptacle to interfere against the inner sidewalls 22A of the contact plug when the plug is moved in the indicated direction. The tapered ends 8 of guide pins 32 serve to lead and direct the receptacle 21 into contact plug 22 while the interference between the contact plug sidewalls 22A and the inner receptacle sidewalls 21A center and position the contact plug to a nominal central position. This centering and positioning of the receptacle during dynamic contact assure the contact pins 36 extending from the bottom surface 37 of the receptacle will align with the contact holes 35 provided within the recessed surface of the contact plug. It is noted that the "forgiveness" or tolerance is provided only to the receptacle 21 and that the contact plug 22 is fixedly attached to the breaker by means of a mounting bracket 19 and mounting holes 40 through which bolts, screws or rivets are inserted. The mounting bracket is fixedly attached to the contact plug 22 by means of a bottom plate 38 and a machine screw 39. Besides allowing receptacle 21 to "search" for alignment within contact plug 22, as previously described, centering springs 31 also take up some of the further motion of the breaker after the contact pins 36 are fully connected within the contact holes 35 and the breaker continues to move within the compartment.

The takeup arrangement which compensates for the further motion of the breaker within the compartment after the receptacle and contact plug of the secondary disconnects have become engaged is best understood by referring back to FIG. 3. Centering pin springs 31 are completely compressed and the pin caps 33 are displaced a maximum distance from the bracket upright 28. When centering pin springs 31 are fully compressed, such as when the breaker proceeds from the position shown in FIG. 2 to that shown in FIG. 3, disconnects 20 move as a unit along with the circuit breaker. Bracket 23 then slides along the compartment via bolts 24, 24 and slots 25 of bracket 23. Takeup spring 26 is extended by motion of post 27 on bracket 23 until circuit breaker receivers 16 fully engage stabs 17 and the circuit breaker comes to rest within the compartment. The compression factor i.e. "strength" of the centering pin springs 31 must be less than the extension factor of the takeup spring 26 to ensure that the centering pin springs will be fully compressed before the takeup spring begins to elongate.

Figure 5:
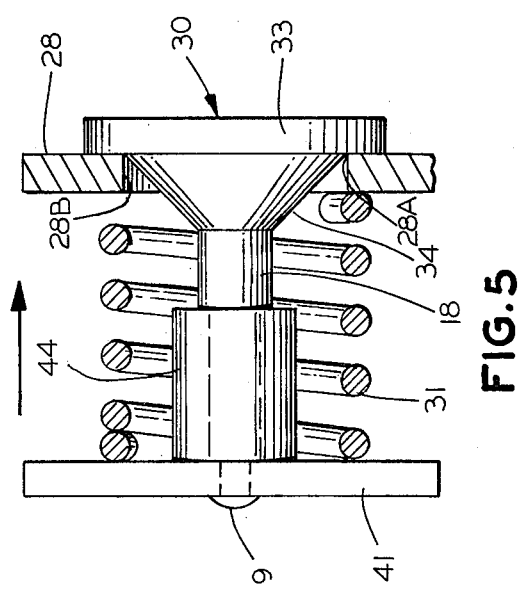
FIG. 5 is an enlarged side view in partial section of the centering pin assembly of FIG. 4 when the contact plug is disconnected.

FIG. 5 contains a detailed expanded view of the centering pin 30 before the receptacle contacts the contact plug similar to the breaker configuration depicted in FIG. 1 and the configuration of the disconnects depicted in FIG. 4. Pin cap 33 rests against the bracket upright 28 and centering pin bevel 34 abuts the upper edge of wall 23A within bracket upright 28 which defines one edge of the bracket opening 29. The other edge of bracket opening 29 is defined by the opposing wall 28B. Centering pin shaft 18 extends through sleeve 44 and is attached to plate 41 by means of machine screw or rivet 9.

Figure 6:
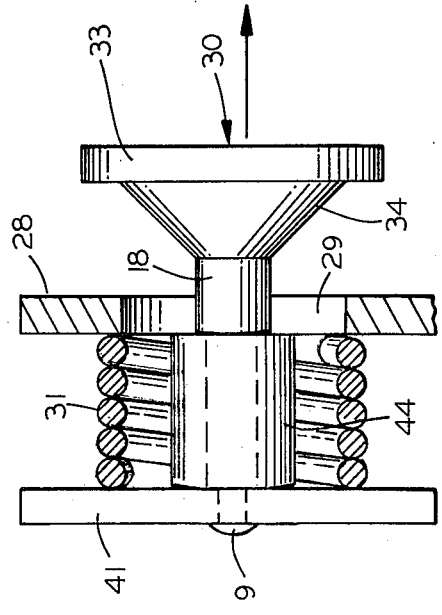
FIG. 6 is an enlarged side view in partial section of the centering pin assembly of FIG. 4 when the contact plug is connected.

FIG. 6 depicts the centering pin 30 when the receptacle and contact plug are connected such as depicted in FIG. 2 and FIG. 3. This condition is termed "static" contact to distinguish over the dynamic contact situation which was described earlier. Centering pin spring 31 is completely compressed between bracket upright 28 and plate 41 such that pin cap 33 is at a maximum displacement from bracket upright 28 and bevel 34 is completely free of bracket opening 29. The provision of bevel 34 on centering pin 30 allows centering pin shaft 18 a great deal of clearance within bracket opening 29 when pin cap 33 moves from the direction indicated in FIG. 6 to that indicated in FIG. 5 and provides a substantial tolerance for any misalignment between the receptacle and the plug as the receptacle moves toward the plug in the indicated direction depicted in FIG. 4. Bevel 34 also serves to center pin shaft 18 within bracket opening 29 by gradually decreasing the rocking motion caused by any misalignment between the contact plug and the receptacle. The bevel "sees" more interference between the walls 28A, 28B of bracket opening 29 as the centering pin cap 33 moves from the furthest position from bracket upright 28, depicted in FIG. 6, to the abutting position depicted in FIG. 5 when the contact plug and receptacle are completely engaged. The provision of bevel 34 on centering pin 30 is an important feature of this invention.

We claim:

1. Secondary disconnect plugs for programmable circuit breakers comprising:
   A. contact plug means including a plurality of contact pins fixedly attached to an electric circuit breaker compartment or to the breaker to provide electrical connection between circuit elements within the breaker and a power source located within the compartment;
   B. contact plug receptacle means including a plurality of corresponding contact pin holes for receiving said contact pins floatingly attached to the sidewall of the breaker compartment or to the sidewall of the breaker by means of centering pins contained within centering springs which maintain a cap at an end of said centering pins against a bracket, said bracket being slibably mounted on said circuit breaker compartment or said circuit breaker sidewall by means of slots for mating with said connector plug means and completing electrical connection between said circuit elements and said compartment power supply when said circuit breaker is in a test position within said compartment and line and load receivers on a back portion of said circuit breaker are disconnected from associated line and load plugs within said compartment as well as when said circuit breaker receivers are in electrical connection with said compartment plugs.

2. The secondary disconnects of claim 1 wherein said centering pins include a shaft, a bevel and a cap.

3. The secondary disconnects of claim 2 wherein said centering pins extend through openings in said bracket and said cap is held against said bracket by means of said centering pin springs when said contact plug means is disconnected from said contact plug receptacle means.

4. The secondary disconnects of claim 3 wherein said bevels contact said bracket openings when said contact plug is not connected with said contact plug receptacle means, and wherein said bevels are out of contact with said bracket openings when said contact plug is connected with said contact plug receptacle means.

5. The secondary disconnects of claim 1 further including means provided on the outer wall of said contact plug receptacle means for directing said contact plug receptacle means outer walls into inner walls within said contact plug means.

6. The secondary disconnects of claim 5 wherein said means for directing said contact plug receptacle means comprises a pair of tapered pins protruding from a forward surface of said contact plug receptacle means.

7. The secondary disconnects of claim 6 further including extension means on said circuit breaker compartment or said breaker sidewall for compensating for continued motion of said circuit breaker within said compartment when said contact plug means comes into contact with said contact plug receptacle means.

8. The secondary disconnects of claim 7 wherein said extension means comprises an extension spring extending between a pair of upright posts connected to said circuit breaker compartment or said circuit breaker sidewall.

9. The secondary disconnects of claim 8 wherein the compression factor of said centering springs is less than the extension factor of said extension spring so that the centering springs will become fully compressed before said extension spring begins to elongate.

10. Secondary disconnect plugs for programmable circuit breakers comprising:
   A. contact plug means including a plurality of contact pins floatingly attached to an electric circuit breaker compartment or to the breaker by means of centering pins contained within centering springs which maintain a cap at an end of said centering pins against a bracket, said bracket being slidably mounted on said circuit breaker comparment or said circuit breaker sidewall by means of slots to provide electrical connection between circuit elements within the breaker and a power source located within the compartment;
   B. contact plug receptacle means including a plurality of corresponding contact pin holes for receiving said contact pins fixedly attached to the sidewall of the breaker compartment or to the sidewall of the breaker by means of centering pins contained within centering springs which maintain a cap at an end of said centering pins against a bracket, said bracket being slidably mounted on said circuit breaker compartment or said circuit breaker sidewall by means of slots for mating with said connector plug means and completing electrical connection between said circuit elements and said compartment power supply when said circuit breaker is in a test position within said comparment and line and load receivers on a back portion of said circuit breaker are disconnected from associated line and load plugs within said comparment as well as when said circuit breaker receivers are in electrical connection with said compartment plugs.

* * * * *